July 31, 1962 E. GROSBAUM ET AL 3,047,790
DIRECT CURRENT MODULATOR
Filed April 30, 1958
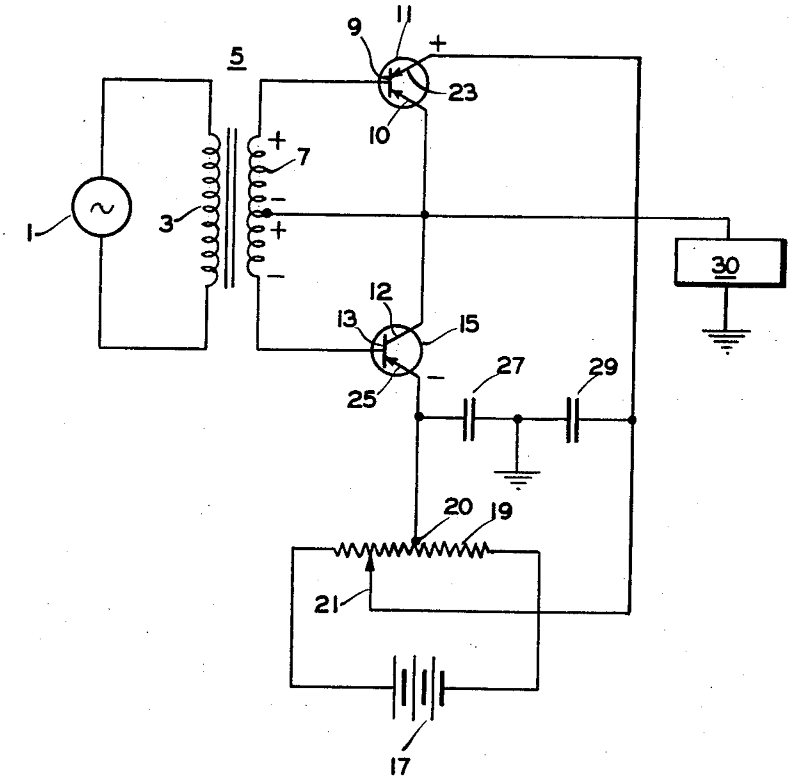
INVENTORS
EUGENE GROSBAUM
ROBERT LEO WORTHINGTON
BY John B. Frisone
ATTORNEY United States Patent Office 3,047,790
Patented July 31, 1962

3,047,790

DIRECT CURRENT MODULATOR

Eugene Grosbaum, East Paterson, and Robert L. Worthington, East Orange, N.J., assignors to The Bendix Corporation, a corporation of Delaware Filed Apr. 30, 1958, Ser. No. 732,022
6 Claims. (Cl. 321—45)

This invention relates to direct current modulators and has as one object to provide a modulator which operates with a floating direct current source.

Another object of the invention is to provide a direct current modulator in which the phase of the output corresponds to the polarity of the direct current being modulated.

Another object of the invention is to provide a modulator which may be used with a direct current source and which has a low impedance return path for either phase of the modulated output.

Another object is to provide a direct current modulator having an output which is substantially insensitive to variations in reference voltage.

A further object of the invention is to provide a direct current modulator having an accurate frequency response and a wide frequency range.

The invention contemplates a modulator comprising switching means gated by an alternating current voltage and energized by a signal from a direct current source to provide a modulated voltage corresponding in phase and amplitude to the polarity and amplitude of the direct current signal, and low impedance circuit means connected across the direct current source and to the switching means and providing a low impedance return path to both switching means for modulated voltages.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

The single FIGURE is a schematic wiring diagram of a novel modulator constructed according to the invention.

In the drawing, a source of alternating current reference voltage 1 is connected across a primary winding 3 of a transformer 5. A centertapped secondary winding 7 on transformer 5 has one end connected to a base 9 of a transistor 11 and its other end to a base 13 of another transistor 15. The centertap on secondary winding 7 is connected to the collectors 10 and 12 of transistors 11 and 15 respectively.

A battery 17 is connected to a potentiometer 19 having its movable contact 21 connected to the emitter 23 of transisor 11 and a centertap 20 connected to the emitter 25 of ransistor 15. When contact 21 is moved from centertap 20 in one direction or the other a difference of potential is applied to emitters 23, 25 of transistors 11, 25 and the polarity is determined by the direction in which the contact is moved from the centertap and the magnitude by the distance. A pair of condensers 27 and 29 are connected across the potential source between emitters 23 and 25 and have their common connection grounded. A load 30 is connected to collectors 10, 12 and to ground.

In operation, alternating reference voltages of opposite phases are applied across the base and collector of each transistor 11, 15 and a direct current signal voltage is applied between the emitters of the transistors. The alternating reference voltage alternately gates the transistors to provide a modulated output at the collectors of the transistors across load 30 corresponding in phase and amplitude to the polarity and amplitude of the direct current signal. A low impedance return path from load 30 for modulated voltage of one phase or opposite phase is provided through condenser 27 or 29 to emitter 23 or 25, depending on the polarity of the signal from potentiometer 19.

Condensers 27, 29 provide a low impedance return path from load 30 for moulated voltage to both transistors and enables the modulator to be used efficiently for signals of reversible polarity.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A modulator comprising switching means gated by an alternating current voltage and energized by a signal from a floating direct current source to provide a modulated voltage corresponding in phase and amplitude to the polarity and amplitude of the direct current signal, and low alternating current impedance circuit means connected across the direct current source and to the switching means and providing a low impedance return path to both switching means for modulated voltages.

2. A modulator comprising a pair of transistors gated by an alternating current voltage and energized by a signal from a floating direct current source to provide a modulated voltage corresponding in phase and amplitude to the polarity and implitude of the direct current signal, and a pair of condensers connected across the direct current source and to the transistors and providing a low impedance return path to both transistors for modulated voltages.

3. A modulator comprising a pair of transistors gated by an alternating current and energized by a signal from a floating direct current source to provide a modulated voltage corresponding in phase and amplitude to the polarity and amplitude of the direct current signal, a load connected to the transistors and energized by the modulated voltage, and a pair of condensers connected across the direct current source and to the load and providing a low impedance return path to both transistors for modulated voltages.

4. A modulator comprising a pair of transistors each having three elements, one element of each transistor being energized by an alternating current voltage and a second element of each transistor being energized by a signal from a direct current source to gate the transistors and provide a modulated voltage at the third element of each transistor corresponding in phase and amplitude to the polarity and amplitude of the direct current signal, and a pair of condensers connected to the second elements of the transistors in parallel with the direct current signal source and providing a low impedance return path to both transistors for modulated voltages.

5. A modulator comprising a pair of transistors each having three elements, one element of each transistor being energized by an alternating current voltage and a second element of each transistor being energized by a signal from a direct current source to gate the transistors and provide a modulated voltage at the third element of each transistor corresponding in phase and amplitude to the polarity and amplitude of the direct current signal, a load connected to the third element of each transistor and energized by the modulated voltage, and a pair of condensers connected to the load and to the second element of each transistor and in parallel with the direct current signal source and providing a low impedance return path to both transistors for modulated voltages.

6. A modulator comprising a pair of transistors each having a base and emitter and a collector, the bases of the transistors being energized by alternating current voltages of opposite phases and the emitters of the transistors being energized by signals of opposite polarities from a floating direct current source to gate the transistors and provide a modulated voltage at the emitters corresponding in phase and amplitude to the polarity and amplitude of the direct current signal relative to the alternating current voltage, a load connected to the collectors and energized by the modulated voltage, and a pair of condensers connected to the emitters in parallel with the direct current source and providing a low impedance return path to both transistors for modulated voltages.

References Cited in the file of this patent

UNITED STATES PATENTS

| | | |
|---|---|---|
| 2,414,102 | Hull et al. | Jan. 14, 1947 |
| 2,475,621 | Klemperer | July 12, 1949 |
| 2,788,493 | Zawels | Apr. 9, 1957 |
| 2,827,611 | Beck | Mar. 18, 1958 |
| 2,840,726 | Hamilton | June 24, 1958 |
| 2,862,171 | Freeborn | Nov. 25, 1958 |
| 2,888,622 | Mooers | May 26, 1959 |
| 2,889,467 | Endres et al. | June 2, 1959 |
| 2,900,506 | Whetter | Aug. 18, 1959 |
| 2,926,296 | Pinckaers | Feb. 23, 1960 |

FOREIGN PATENTS

| | | |
|---|---|---|
| 203,165 | Australia | Dec. 8, 1955 |